United States Patent
Jang et al.

(10) Patent No.: US 11,002,339 B2
(45) Date of Patent: May 11, 2021

(54) POWER TRANSMISSION APPARATUS FOR A VEHICLE

(71) Applicants: Hyundai Motor Company, Seoul (KR); Kia Motors Corporation, Seoul (KR)

(72) Inventors: Cheol Ho Jang, Busan (KR); Woochurl Son, Seongnam-si (KR); Sun Sung Kwon, Anyang-si (KR); Seong Wook Hwang, Gunpo-si (KR); Kijong Park, Hwaseong-si (KR); Yong Uk Shin, Suwon-si (KR); Seongwook Ji, Gunpo-si (KR); Ki Tae Kim, Incheon (KR); Chon Ok Kim, Yongin-si (KR); Wonmin Cho, Hwaseong-si (KR); Hyun Sik Kwon, Seoul (KR); Ilhan Yoo, Hwasun-eup (KR); Juhyeon Park, Suwon-si (KR); Minho Chae, Incheon (KR); Dongwoo Kim, Incheon (KR); Hye Jin Lim, Seoul (KR); Soonki Eo, Ansan-si (KR); Ki Dong Kim, Anyang-si (KR); Woo Jin Chang, Suwon-si (KR); Yong Sug Choi, Hwaseong-si (KR); Young Chan Gweon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 431 days.

(21) Appl. No.: 16/200,302

(22) Filed: Nov. 26, 2018

(65) Prior Publication Data
US 2020/0063829 A1 Feb. 27, 2020

(30) Foreign Application Priority Data
Aug. 22, 2018 (KR) .......................... 10-2018-0098115

(51) Int. Cl.
*F16H 3/00* (2006.01)
*F16H 3/72* (2006.01)

(52) U.S. Cl.
CPC ............. *F16H 3/006* (2013.01); *F16H 3/001* (2013.01); *F16H 3/724* (2013.01);
(Continued)

(58) Field of Classification Search
CPC ........... F16H 3/006; F16H 3/001; F16H 3/724
(Continued)

(56) References Cited

U.S. PATENT DOCUMENTS 8,323,142 B2    12/2012   Masumoto
10,549,623 B1 *  2/2020   Park .......................... B60K 6/40
(Continued)

FOREIGN PATENT DOCUMENTS

EP              3 121 483 A1    1/2017

*Primary Examiner* — Ha Dinh Ho
(74) *Attorney, Agent, or Firm* — Morgan, Lewis & Bockius LLP

(57) ABSTRACT

A power transmission apparatus for a vehicle may include a first input shaft directly connected to a motor/generator, a second and third input shafts coaxial and selectively connectable to the first input shaft, a torque mediating shaft coaxial with the first input shaft, an intermediate shaft and output shaft disposed in parallel with the first input shaft, a first shifting section receiving torque from the third input shaft and outputting a modified torque to the torque mediating shaft, a second shifting section including first planetary gear set, shifting torque of the first input shaft to output the shifted torque to the torque mediating shaft, and selectively stopping the torque mediating shaft, and a third shifting section including second planetary gear set, forming an output torque in combination of torques from the first and second shifting sections and the second input shaft, and outputting the output torque to the output shaft.

17 Claims, 4 Drawing Sheets

(52) U.S. Cl.
CPC ............... *F16H 2003/007* (2013.01); *F16H 2200/0021* (2013.01); *F16H 2200/0052* (2013.01); *F16H 2200/2007* (2013.01); *F16H 2200/2046* (2013.01)

(58) Field of Classification Search
USPC .......................................... 74/330, 331, 661
See application file for complete search history.

(56) References Cited

U.S. PATENT DOCUMENTS

| | | | |
|---|---|---|---|
| 10,668,797 B2* | 6/2020 | Chae | F16H 3/725 |
| 10,704,652 B2* | 7/2020 | Jang | F16H 37/0833 |
| 10,746,271 B2* | 8/2020 | Hwang | F16H 61/688 |
| 10,766,352 B2* | 9/2020 | Park | F16H 3/006 |
| 10,851,875 B1* | 12/2020 | Park | B60K 6/547 |
| 2013/0031990 A1 | 2/2013 | Singh et al. | |

* cited by examiner

FIG. 2

|  | Shift-stage | ECL | CL1 | CL2 | CL3 | B1 | B2 |
|---|---|---|---|---|---|---|---|
| Engine and Parallel mode | FD1 | ● |  |  | ● |  | ● |
|  | FD2 | ● | ● |  | ● |  |  |
|  | FD3 | ● |  | ● | ● |  |  |
|  | FD4 | ● | ● | ● |  |  |  |
|  | FD5 | ● |  | ● |  |  | ● |
|  | FD6 | ● |  | ● |  | ● |  |
| EV mode | FD1 |  |  |  | ● |  | ● |
|  | FD2 |  | ● |  | ● |  |  |
|  | FD3 |  |  | ● | ● |  |  |
|  | FD4 |  | ● | ● |  |  |  |
|  | FD5 |  |  | ● |  |  | ● |
|  | FD6 |  |  | ● |  | ● |  |

FIG. 4

| Mode | Shift-stage | ECL | CL1 | CL2 | CL3 | CL4 | B1 | B2 | SN1 IDG2 | SN1 N | SN1 IDG4 | SN2 TMG | SN2 N |
|---|---|---|---|---|---|---|---|---|---|---|---|---|---|
| Engine and Parallel mode | REV | ● | ● |  | ● |  |  |  |  |  | ● | ○ | ● |
|  | FD1 | ● |  |  | ● |  | ● |  | ○ | ● | ○ | ● |  |
|  | FD2 | ● | ● |  | ● |  |  |  | ● |  |  | ○ | ● |
|  | FD3 | ● |  |  | ● | ● |  |  | ○ | ● | ○ | ● |  |
|  | FD4 | ● |  | ● | ● |  |  |  | ○ | ● | ○ | ○ | ● |
|  | FD5 | ● |  | ● |  | ● |  |  | ○ | ● | ○ | ● |  |
|  | FD6 | ● | ● | ● |  |  |  |  | ● |  |  | ○ | ● |
|  | FD7 | ● |  | ● |  |  |  | ● | ○ | ● | ○ | ● |  |
|  | FD8 | ● |  | ● |  |  | ● |  | ○ | ● | ○ | ● |  |
|  | FD9 | ● | ● | ● |  |  |  |  |  |  | ● | ○ | ● |
| EV mode | REV |  | ● |  | ● |  |  |  |  |  | ● | ○ | ● |
|  | FD1 |  |  |  | ● |  | ● |  | ○ | ● | ○ | ● |  |
|  | FD2 |  | ● |  | ● |  |  |  | ● |  |  | ○ | ● |
|  | FD3 |  |  |  | ● | ● |  |  | ○ | ● | ○ | ● |  |
|  | FD4 |  |  | ● | ● |  |  |  | ○ | ● | ○ | ○ | ● |
|  | FD5 |  |  | ● |  | ● |  |  | ○ | ● | ○ | ● |  |
|  | FD6 |  | ● | ● |  |  |  |  | ● |  |  | ○ | ● |
|  | FD7 |  |  | ● |  |  |  | ● | ○ | ● | ○ | ● |  |
|  | FD8 |  |  | ● |  |  | ● |  | ○ | ● | ○ | ● |  |
|  | FD9 |  | ● | ● |  |  |  |  |  |  | ● | ○ | ● |

○ : Preliminary engagement available

POWER TRANSMISSION APPARATUS FOR A VEHICLE

CROSS-REFERENCE TO RELATED APPLICATION

The present application claims priority to Korean Patent Application No. 10-2018-0098115 filed on Aug. 22, 2018, the entire contents of which is incorporated herein for all purposes by this reference.

BACKGROUND OF THE INVENTION

Field of the Invention

The present invention relates to a power transmission apparatus configured for a vehicle.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such a future vehicle technology.

The double clutch transmission (DCT) may include two clutches devices and a gear train of a basically manual transmission, selectively transmits a torque input from an engine to two input shafts by use of the two clutches devices, and outputs a torque shifted by the gear train.

Such a double clutch transmission (DCT) attempts to compactly realize a multi-stage transmission of more than five speeds. The DCT achieves an automated manual transmission (AMT) that removes the inconvenience of a manual shifting of a driver, by controlling two clutches and synchronizers by a controller.

In comparison with an automatic transmission using planetary gears, such a DCT shows merits, such as higher efficiency in power delivery, easier modification in revising or adding parts to achieve more shifting stages, etc., and thus gathers more spotlight since it can more comfortably conform to fuel consumption regulation and efficiency in achieving more shifting stages.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus configured for a vehicle having an advantage of achieving shifting stages in an electric vehicle mode and in a parallel hybrid mode by employing two planetary gear sets and a motor/generator to a double clutch scheme, improving fuel consumption and better applicability to a hybrid vehicle.

An exemplary power transmission apparatus is for a vehicle having an engine and a motor/generator having a motor shaft. The power transmission apparatus may include a first input shaft, a second input shaft, a third input shaft, a torque mediating shaft, an intermediate shaft, an output shaft, a first shifting section, a second shifting section, and a third shifting section. The first input shaft may be directly connected to the motor/generator. The second input shaft may be formed as a hollow shaft, disposed coaxial with and external to the first input shaft without rotational interference therebetween, and selectively connectable to the first input shaft. The third input shaft may be formed as a hollow shaft, disposed coaxial with and external to the second input shaft without rotational interference therebetween, and selectively connectable to the first input shaft. The torque mediating shaft may be formed as a hollow shaft disposed coaxial with and external to the first input shaft without rotational interference therebetween. The intermediate shaft may be disposed in parallel with the first input shaft. The output shaft may be disposed in parallel with the first input shaft. The first shifting section may receive a torque selectively transmitted from the third input shaft, and modify the received torque to output the modified torque to the torque mediating shaft. The second shifting section may include a first planetary gear set having a first sun gear, a first planet carrier, and a first ring gear, shift a torque of the first input shaft to output the shifted torque to the torque mediating shaft, and selectively stop a rotation of the torque mediating shaft, the first sun gear being fixedly connected to the first input shaft. The third shifting section may include a second planetary gear set having a second sun gear, a second planet carrier, and a second ring gear, form an output torque in combination of a torque input from the first and second shifting sections and a torque selectively input from the second input shaft, and output the output torque to the output shaft the second sun gear being fixedly connected to the output shaft.

The first shifting section may include a first gear set and a second gear set. The first gear set may include a first drive gear fixedly connected to the third input shaft, and a first driven gear fixedly connected to the intermediate shaft and externally gear-meshed with the first drive gear. The second gear set may include a second drive gear fixedly connected to the intermediate shaft, a torque mediating gear fixedly connected to the torque mediating shaft and externally gear-meshed with the second drive gear, and a second driven gear fixedly connected to the second ring gear of the second planetary gear set and externally gear-meshed with the torque mediating gear.

The first sun gear of the first planetary gear set may be fixedly connected to the first input shaft. The first planet carrier of the first planetary gear set may be fixedly connected to the torque mediating shaft and selectively connectable to a transmission housing. The first ring gear of the first planetary gear set may be selectively connectable to the transmission housing.

The second sun gear of the second planetary gear set may be fixedly connected to the output shaft and selectively connectable to a second ring gear. The second planet carrier of the second planetary gear set may receive a torque from the second input shaft through a third gear set. The second ring gear of the second planetary gear set may receive a torque from the first and second shifting sections.

The third gear set may include a third drive gear fixedly connected to the second input shaft, and a third driven gear fixedly connected to the second planet carrier of the second planetary gear set and externally gear-meshed with the third drive gear.

Gear ratios of the first gear set and the second gear set may be used for realizing the second forward speed. A gear ratio of the third gear set may be used for realizing the third forward speed. A gear ratio of the torque mediating gear and the second driven gear may be used for realizing the first forward speed.

The power transmission apparatus may further include four clutches each selectively connecting a corresponding pair among the shafts and rotation elements of the second planetary gear set, and two brakes each selectively connecting a rotation element of the first planetary gear set to the transmission housing.

The four clutches may include an engine clutch disposed between the first input shaft and an engine output shaft connected to the engine, a first clutch disposed between the first input shaft and the third input shaft, a second clutch disposed between the first input shaft and the second input shaft, and a third clutch disposed between the second ring gear and the output shaft fixedly connected to the second sun gear. The two brakes may include a first brake disposed between the first planet carrier of the first planetary gear set and the transmission housing, and a second brake disposed between the first ring gear of the first planetary gear set and the transmission housing.

The first shifting section may include an idle shaft, first, second, fourth, and fifth gear sets. The idle shaft may be disposed in parallel with the intermediate shaft. The first gear set may include a first drive gear fixedly connected to the third input shaft, and a first driven gear fixedly connected to the intermediate shaft and externally gear-meshed with the first drive gear. The second gear set may include a second drive gear disposed coaxial with the intermediate shaft without rotational interference therebetween, a torque mediating gear disposed coaxial with the torque mediating shaft without rotational interference and externally gear-meshed with the second drive gear, and a second driven gear fixedly connected to the second ring gear of the second planetary gear set and externally gear-meshed with the torque mediating gear. The fourth gear set may include a fourth drive gear disposed coaxial with and external to the intermediate shaft without rotational interference therebetween, and a fourth driven gear fixedly connected to the idle shaft and externally gear-meshed with the fourth drive gear. The fifth gear set may include a fifth drive gear fixedly connected to the idle shaft, and a torque mediating gear externally gear-meshed with the fifth drive gear.

The first shifting section may further include a first synchronizer selectively connecting the second drive gear and the fourth drive gear to the intermediate shaft, and a second synchronizer selectively connecting the torque mediating gear to the torque mediating shaft.

The idle shaft may receive a torque from the intermediate shaft through the fourth gear set and output a torque of decreased rotation speed to the third shifting section through the fifth gear set.

The first sun gear of the first planetary gear set may be fixedly connected to the first input shaft. The first planet carrier of the first planetary gear set may be fixedly connected to the torque mediating shaft and selectively connectable to the transmission housing. The first ring gear of the first planetary gear set may be selectively connectable to the transmission housing. The first planet carrier and the first ring gear may be selectively interconnected.

The second sun gear of the second planetary gear set may be fixedly connected to the output shaft and selectively connectable to the second ring gear. The second planet carrier of the second planetary gear set may receive a torque from the second input shaft through a third gear set. The second ring gear of the second planetary gear set may receive a torque from the first and second shifting sections through the second gear set.

The third gear set may include a third drive gear fixedly connected to the second input shaft, and a third driven gear fixedly connected to the second planet carrier of the second planetary gear set and externally gear-meshed with the third drive gear.

Gear ratios of the fourth and fifth gear sets may be used for realizing the ninth forward speed and the reverse speed. A gear ratio of the second drive gear may be used for realizing the second forward and sixth speeds. A gear ratio of the torque mediating gear may be used for realizing the first forward speed, the third forward speed, the fifth forward speed, and the seventh forward speed.

The power transmission apparatus may further include five clutches each selectively connecting a corresponding pair among the shafts and rotation elements of the first and second planetary gear sets, and two brakes each selectively connecting a rotation element of the first planetary gear set to the transmission housing.

The five clutches may include an engine clutch disposed between the first input shaft and an engine output shaft connected to the engine, a first clutch disposed between the first input shaft and the third input shaft, a second clutch disposed between the first input shaft and the second input shaft, a third clutch disposed between the second ring gear and the output shaft fixedly connected to the second sun gear, and a fourth clutch disposed between the first ring gear and the first planet carrier. The two brakes may include a first brake disposed between the first planet carrier of the first planetary gear set and the transmission housing, and a second brake disposed between the first ring gear of the first planetary gear set and the transmission housing.

A power transmission apparatus configured for a vehicle according to various exemplary embodiments realizes six shifting stages by employing two planetary gear sets and one motor/generator to a multiple clutch transmission, facilitating multiple shifting stages by a simplified arrangement, improving installability, and reducing an overall weight. Furthermore, an engine driving mode, a parallel hybrid mode, and an electric vehicle mode are realized in multiple shifting stages, improving fuel consumption.

A power transmission apparatus configured for a vehicle according to an exemplary embodiment of the present invention realizes shifting stages of nine forward speeds and one reverse speed by further employing one clutch and two synchronizers than in the various exemplary embodiments. Furthermore, an engine driving mode, a parallel hybrid mode, and an electric vehicle mode are realized in multiple shifting stages, further improving fuel consumption.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a shifting operation chart of a power transmission apparatus configured for a vehicle according to various exemplary embodiments of the present invention.

FIG. 4 is a shifting operation chart of a power transmission apparatus configured for a vehicle according to various exemplary embodiments of the present invention.

Figure 1:
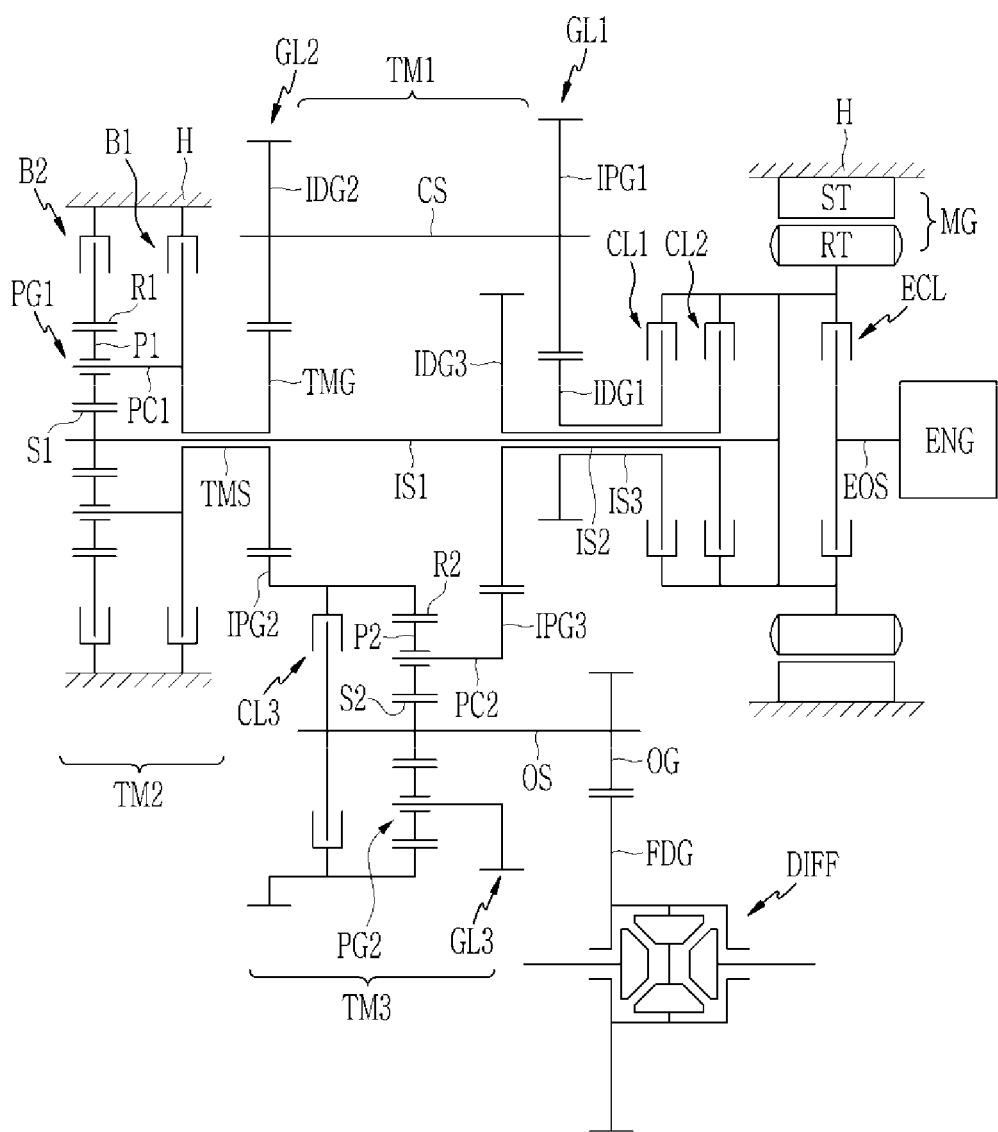
FIG. 1 is a schematic view of a power transmission apparatus configured for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic view of a power transmission apparatus configured for a vehicle according to various exemplary embodiments of the present invention.

Referring to FIG. 1, a power transmission apparatus configured for a vehicle according to various exemplary embodiments of the present invention shifts torques of an engine ENG as a primary power source and a motor/generator MG as an auxiliary power source, and may include first, second, and third input shafts IS1, IS2, and IS3, a torque mediating shaft TMS, an intermediate shaft CS, first, second, and third shifting sections TM1, TM2, and TM3, and an output shaft OS.

The engine ENG is a primary power source and a variety of typical engines such as a gasoline engine or a diesel engine that utilizes fossil fuel may be used as the engine ENG.

The motor/generator MG as an auxiliary power source may act as a motor and also as a generator, and includes a stator ST and a rotor RT, where the stator ST is fixed to the transmission housing H and the rotor RT is rotatably supported within the stator ST.

Torques from the engine ENG and/or the motor/generator MG are supplied to the first and second shifting sections TM1 and TM2, and a plurality of intermediate shifting stages are formed at the first and second shifting sections TM1 and TM2 by the supplied torques. Receiving a torque from the first and second shifting sections TMT1 and TM2 and selectively receiving a torque from the engine ENG through a separate route, the third shifting section TM3 performs shifting operation and outputs a shifted torque through the output shaft OS.

The first, second, and third input shafts IS1, IS2, and IS3 and the torque mediating shaft TMS are disposed on a same axis. The intermediate shaft CS and the output shaft OS are disposed in parallel with the first, second, and third input shafts IS1, IS2, and IS3.

The motor/generator MG is disposed to be rear of the engine ENG. The rotor RT of the motor/generator MG is selectively connectable to an output shaft EOS of the engine ENG interposing an engine clutch ECL.

The first input shaft IS1 is fixedly connected to the rotor RT of the motor/generator MG. The first input shaft IS1 delivers torques from the engine ENG and the motor/generator MG to the second shifting section TM2.

The second input shaft IS2 is formed as a hollow shaft and disposed coaxial with and external to the first input shaft IS1 without rotational interference therebetween, and selectively connectable to the first input shaft IS1 thereby selectively transmitting torques of the engine ENG and the motor/generator MG to the third shifting section TM3.

The third input shaft IS3 is formed as a hollow shaft and disposed coaxial with and external to the second input shaft IS2 without rotational interference therebetween, and selectively connectable to the first input shaft IS1 thereby transmitting the torques of the engine ENG and the motor/generator MG to the first shifting section TM1.

The torque mediating shaft TMS is formed as a hollow shaft and disposed coaxial with and external to the first input shaft IS1.

The first shifting section TM1 includes the intermediate shaft CS. The intermediate shaft CS is externally gear-meshed with the third input shaft IS3 through the first gear set GL1, and externally gear-meshed with the torque mediating shaft TMS through the second gear set GL2.

The second shifting section TM2 includes a first planetary gear set PG1, of which a first planet carrier PC1 is fixedly connected to the torque mediating shaft TMS. The first planetary gear set PG1 is a single pinion planetary gear set, and includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1.

The first sun gear S1 is fixedly connected to the first input shaft IS1. The first planet carrier PC1 is fixedly connected to the torque mediating shaft TMS and selectively connectable to the transmission housing H. The first ring gear R1 is selectively connectable to the transmission housing H.

As a result, when the first ring gear R1 is fixed to the transmission housing H, the rotation speed of the first planet carrier PC1 becomes decreased in comparison with the speed of the first sun gear S1 receiving a torque input from the first input shaft IS1. Thus, the first planetary gear set PG1 receiving a torque of the first input shaft IS1 through the first sun gear S1 forms a shifted intermediate torque with a decreased rotation speed and outputs the shifted intermediate torque through the first planet carrier PC1 and the torque mediating shaft TMS. When the torque mediating shaft TMS is fixed to the transmission housing H, the rotation of the torque mediating gear TMG is stopped.

The third shifting section TM3 includes a second planetary gear set PG2.

The second planetary gear set PG2 is a single pinion planetary gear set, and includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2.

The second sun gear S2 is selectively connectable to the second ring gear R2 and fixedly connected to the output shaft OS thereby always acting as an output element. The second planet carrier PC2 is connected to the second input shaft IS2 through the third gear set GL3 thereby selectively receiving a torque from the engine ENG, The second ring gear R2 receives a torque from the second shifting section TM2 through the second gear set GL2.

When the second planetary gear set PG2 integrally rotates, torques input through the second gear set GL2 or third gear set GL3 are output as inputted to the output shaft OS. Otherwise, torques input through the second gear set GL2 and third gear set GL3 are combined to form a shifted output torque of an increased or decreased rotation speed by the cooperative operation of rotation members of the second planetary gear set PG2, and the shifted output torque is output through the output shaft OS.

The first gear set GL1 includes a first drive gear IDG1 fixedly connected to the third input shaft IS3, and a first driven gear IPG1 fixedly connected to the intermediate shaft CS and externally gear-meshed with the first drive gear IDG1.

The second gear set GL2 includes a second drive gear IDG2 fixedly connected to the intermediate shaft CS, a torque mediating gear TMG fixedly connected to the torque mediating shaft TMS and externally gear-meshed with the second drive gear IDG2, and a second driven gear IPG2 fixedly connected to the third ring gear R3 and externally gear-meshed with the torque mediating gear TMG.

The third gear set GL3 includes a third drive gear IDG3 fixedly connected to the second input shaft IS2, and a third driven gear IPG3 fixedly connected to the second planet carrier PC2 and externally gear-meshed with the third drive gear IDG3.

Gear ratios of the first, second, and third gear sets G1, G2, and G3 may be set according to design factors such as engine and vehicle specifications.

According to an exemplary embodiment of the present invention, gear ratios of the first gear set GL1 and the second gear set GL2 are used for realizing the second forward speed. The gear ratio of the third gear set GL3 is used for realizing the third forward speed. The gear ratio between the torque mediating gear TMG and the second driven gear IDG2 forming the second gear set GL2 is used for realizing the first forward speed.

The output shaft OS is an output element, and by receiving torques input from the second planetary gear set PG2, transmits the received torque to a differential DIFF through the output gear OG and the final reduction gear FDG.

Furthermore, five engagement elements of an engine clutch ECL and first to fourth clutches CL1, CL2, CL3, and CL4 are disposed between rotation members such as various shafts, and two engagement elements of two brakes B1 and B2 are disposed between a rotation member and the transmission housing H.

The engine clutch ECL is disposed between the engine output shaft EOS (e.g., engine crankshaft) and the first input shaft IS1, and selectively interconnects the engine output shaft EOS and the first input shaft IS1.

The first clutch CL1 is disposed between the first input shaft IS1 and the third input shaft IS3, and selectively connects the first input shaft IS1 and the third input shaft IS3.

The second clutch CL2 is disposed between the first input shaft IS1 and the second input shaft IS2, and selectively connects the first input shaft IS1 and the second input shaft IS2.

The third clutch CL3 is disposed between the second ring gear R2 and the second sun gear S2 fixed to the output shaft OS, and selectively connects the second ring gear R2 and the second sun gear S2.

Therefore, the second planetary gear set PG2 integrally rotates by the operation of the third clutch CL3.

The first brake B1 is disposed between the transmission housing H and the first planet carrier PC1 fixedly connected to the torque mediating shaft TMS, and therefore, the first planet carrier PC1 selectively acts as a fixed element.

The second brake B2 is disposed between the first ring gear R1 and the transmission housing H, and therefore, the first ring gear R1 selectively acts as a fixed element.

The engagement elements of the engine clutch ECL, the first to third clutches CL1 to CL3, and the first and second brakes B1 and B2 may be realized as multi-plate hydraulic pressure friction devices that are frictionally engaged by hydraulic pressure, however, it may not be understood to be limited thereto, since various other configuration that are electrically controllable may be available.

FIG. 2 is a shifting operation chart of a power transmission apparatus configured for a vehicle according to various exemplary embodiments of the present invention, and the power transmission apparatus configured for a vehicle according to various exemplary embodiments performs shifting operation as follows.

[The Engine and Parallel Mode First Forward Speed]

In the engine and parallel mode first forward speed FD1, as shown in FIG. 2, the engine clutch ECL, the third clutch CL3, and the second brake B2 are operated.

As a result, the torque of the engine ENG is transmitted to the first sun gear S1 of second shifting section TM2 through the first input shaft IS1. In the second shifting section TM2, the first ring gear R1 acts as a fixed element by the operation of the second brake B2, and a torque of a decreased rotation speed is output through the first planet carrier PC1.

As such, the torque output from the first planet carrier PC1 is input to the second driven gear IPG2 of the third shifting section TM3 through the torque mediating shaft TMS and the torque mediating gear TMG. In the third shifting section TM3, the second planetary gear set PG2 integrally rotates by the operation of the third clutch CL3, and therefore, the torque input to the second ring gear R2 is output as inputted, to the differential DIFF through the output shaft OS, realizing the first forward speed FD1.

The first forward speed is realized by the reduction ratio of the first planetary gear set PG1 and the gear ratio of the second gear set GL2.

[The Engine and Parallel Mode Second Forward Speed]

In the engine and parallel mode second forward speed FD2, as shown in FIG. 2, the engine clutch ECL, the first, third clutch CL1, and the CL3 are operated.

As a result, by the operation of the first clutch CL1, the torque of the engine ENG is input to the first shifting section TM1 through the third input shaft IS3, and the torque of the first input shaft IS1 is transmitted through the first drive gear IDP1, the first driven gear IPG1, the intermediate shaft CS, the second drive gear IDG2, the torque mediating gear TMG, and the second driven gear IPG2.

In the third shifting section TM3, the second planetary gear set PG2 integrally rotates by the operation of the third clutch CL3, and therefore, the torque input to the second ring gear R2 is output as inputted, to the differential DIFF through the output shaft OS, realizing the second forward speed FD2.

The gear ratios of the first and second gear sets GL1 and GL2 are used for realizing the second forward speed.

[The Engine and Parallel Mode Third Forward Speed]

In the engine and parallel mode third forward speed FD3, as shown in FIG. 2, the engine clutch ECL, the second and third clutches CL2, and the CL3 are operated.

As a result, by the operation of the second clutch CL2, the torque of the engine ENG is input to the third shifting section TM3 through the second input shaft IS2, and the torque of the second input shaft IS2 is input to the second planet carrier PC2 of the third shifting section TM3 through the third gear set GL3.

In the third shifting section TM3, the second planetary gear set PG2 integrally rotates by the operation of the third clutch CL3, and therefore, the torque input to the second planet carrier PC2 is output as inputted, to the differential DIFF through the output shaft OS, realizing the third forward speed FD3.

The gear ratio of the third gear set GL31 used for realizing the second forward speed.

[The Engine and Parallel Mode Fourth Forward Speed]

In the engine and parallel mode fourth forward speed FD4, as shown in FIG. 2, the engine clutch ECL, the first, and the second clutches CL1 and CL2 are operated.

As such, by the operation of the first clutch CL1, the torque of the engine ENG is input to the first shifting section TM1 through the third input shaft IS3, and the torque of the third input shaft IS3 is input through the first drive gear IDP1, the first driven gear IPG1, the intermediate shaft CS, the second drive gear IDG2, the torque mediating gear TMG, and the second driven gear IPG2.

In the third shifting section TM3, a torque is input to the second ring gear R2 from the first shifting section TM1 through the second drive gear IDG2, the torque mediating gear TMG, and the second driven gear IPG2, and simultaneously, the second planet carrier PC2 receives a torque from the second input shaft IS2 through the third gear set GL3 by the operation of the second clutch CL2.

As a result, in the third shifting section TM3, an output torque is formed by cooperative operation of rotation speeds of the second ring gear R2 and the second planet carrier PC2, and the output torque is transmitted to the differential DIFF through the output shaft OS, realizing the fourth forward speed FD4.

In such a fourth forward speed, the torque according to the gear ratios of the first and second gear sets GL1 and GL2 is input to the second ring gear R2, and the torque according to the gear ratio of the third gear set GL3 is input to the second planet carrier PC2, forming a shifting with an increased rotation speed.

[The Engine and Parallel Mode Fifth Forward Speed]

In the engine and parallel mode fifth forward speed FD5, as shown in FIG. 2, the engine clutch ECL, the second clutch CL2, and the second brake B2 are operated.

As a result, the torque of the engine ENG is transmitted to the first sun gear S1 of second shifting section TM2 through the first input shaft IS1. In the second shifting section TM2, the first ring gear R1 acts as a fixed element by the operation of the second brake B2, and a torque of a decreased rotation speed is output through the first planet carrier PC1.

As such, the torque output from the first planet carrier PC1 is input to the second ring gear R2 of the third shifting section TM3 through the torque mediating shaft TMS, the torque mediating gear TMG, and the second driven gear IPG2. Furthermore, by the operation of the second clutch CL2, the torque of the second input shaft IS2 is input to the second planet carrier PC2 of the third shifting section TM3 through the third drive gear IDP3 and the third driven gear IPG3.

In the third shifting section TM3, an output torque is formed by cooperative operation of rotation speeds of the second ring gear R2 and the second planet carrier PC2, and the output torque is transmitted to the differential DIFF through the output shaft OS, realizing the fifth forward speed FD5.

In such a fifth forward speed, a torque from the second shifting section TM2 is input to the second ring gear R2, and a torque according to the gear ratio of the third gear set GL3 is input to the second planet carrier PC2. In such a fifth forward speed, the planetary gear set PG outputs a further increased speed than in the fourth forward speed.

[The Engine and Parallel Mode Sixth Forward Speed]

In the engine and parallel mode sixth forward speed FD6, as shown in FIG. 2, the engine clutch ECL, the second clutch CL2, and the first brake B1 are operated.

As a result, in the second shifting section TM2, the first planet carrier PC1 acts as a fixed element by the operation of the first brake B1, forcing the torque mediating shaft TMS, the torque mediating gear TMG, and the second driven gear IPG2 to stop.

Therefore, in the third shifting section TM3, the second ring gear R2 externally gear-meshed with the second driven gear IPG2 acts as a fixed element. In such a state, by the operation of the second clutch CL2, the torque of the second input shaft IS2 is input to the second planet carrier PC2 of the third shifting section TM3 through the third drive gear IDP3 and the third driven gear IPG3.

As such, since the second ring gear R2 acts as a fixed element and the second planet carrier PC2 receives an input torque, the third shifting section TM3 forms an output torque of an increased rotation speed, and the output torque is transmitted to the differential DIFF through the output shaft OS, realizing the sixth forward speed FD6.

In such a sixth forward speed, the planetary gear set PG outputs a further increased speed than in the fifth forward speed.

In the above description of the "engine and parallel mode", only the engine ENG is exampled as a power source. However, it may be obviously understood that such shifting operation may be maintained even if the motor/generator MG is activated to form a parallel mode and assist the engine ENG.

An electric vehicle mode EV mode differs from the engine and parallel mode, only in that the engine ENG is stopped while releasing the engine clutch ECL and only the motor/generator MG is used as sole power source. It may be understood that such a difference will not affect the above-described shifting operation, and thus, in such an electric vehicle mode EV mode the same shaft shifting stages of one reverse speed REV and nine forward speeds of the first forward speed FD1 to the sixth forward speed FD6 may be obtained by the same operational chart.

It may be understood that the reverse speed may be achieved by operating the motor/generator MG in a reverse direction thereof.

A power transmission apparatus configured for a vehicle according to various exemplary embodiments realizes six shifting stages by employing two planetary gear sets and one motor/generator to a multiple clutch transmission, facilitating multiple shifting stages by a simplified arrangement, improving installability, and reducing an overall weight. Furthermore, an engine driving mode, a parallel hybrid mode, and an electric vehicle mode are realized in multiple shifting stages, improving fuel consumption.

Figure 3:
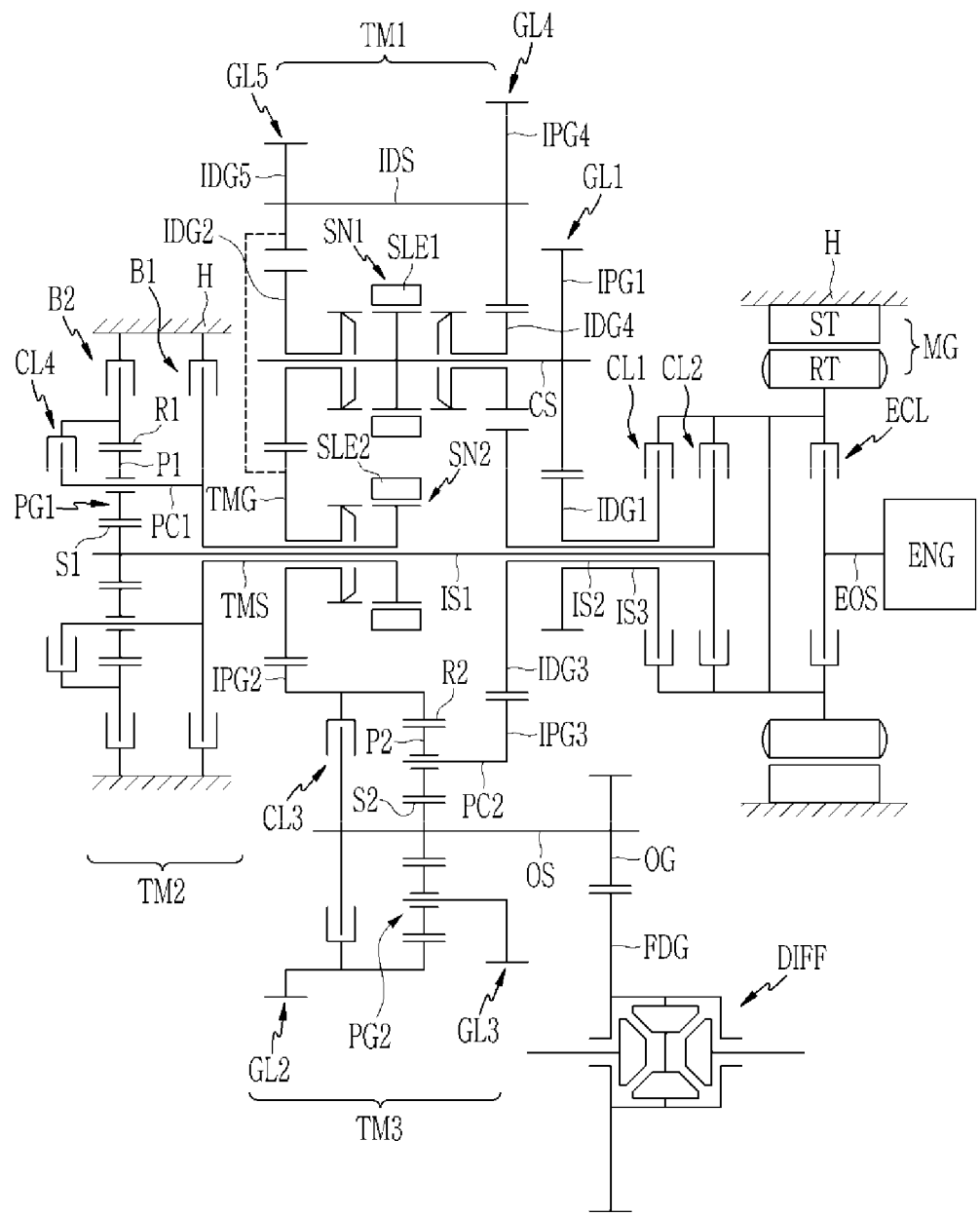
FIG. 3 is a schematic view of a power transmission apparatus configured for a vehicle according to various exemplary embodiments of the present invention.

FIG. 3 is a schematic view of a power transmission apparatus configured for a vehicle according to various exemplary embodiments of the present invention.

Referring to FIG. 3, various exemplary embodiments in comparison with the various exemplary embodiments in FIG. 1 further employs an idle shaft IDS, first and second synchronizers SN1 and SN2 in first and second shifting sections TM1 and TM2, fourth and fifth gear sets G4 and G5, and a fourth clutch CL4, and realizes nine forward speeds and one reverse speed.

In the first shifting section TM1, the idle shaft IDS is disposed in parallel with the intermediate shaft CS. The idle shaft IDS receives a torque from the intermediate shaft CS through the fourth gear set GL4, and outputs a torque to the third shifting section TM3 through the fifth gear set GL5.

The second drive gear IDG2 of the intermediate shaft CS is disposed coaxial with and external to the intermediate shaft CS without rotational interference therebetween.

The fourth gear set GL4 includes a fourth drive gear IDG4 rotatably disposed on an external circumference of the intermediate shaft CS without rotational interference therebetween, and a fourth driven gear IPG4 fixedly connected to the idle shaft IDS and externally gear-meshed with the fourth drive gear IDG4.

The fifth gear set GL5 includes a fifth drive gear IDG5 fixedly connected to the idle shaft IDS, and a torque mediating gear TMG externally gear-meshed with the fifth drive gear IDG5.

The second drive gear IDG2 and the fourth drive gear IDG4 are selectively connectable to the intermediate shaft CS through the first synchronizer SN1.

The second shifting section TM2 further employs the fourth clutch CL4, the fourth clutch CL4 is disposed between the first planet carrier PC1 and the first ring gear R1 of the first planetary gear set PG1, to enable the first planetary gear set PG1 to integrally rotate The torque mediating gear TMG is disposed coaxial with and external to the torque mediating shaft TMS without rotational interference therebetween, and selectively connectable to the torque mediating shaft TMS through the second synchronizer SN2.

The gear ratios of the fourth and fifth gear sets GL4 and GL5 are used for realizing the ninth forward speed and the reverse speed. The gear ratio of the second drive gear IDG2 is used for realizing the second forward speed and the sixth forward speed. The gear ratio of the torque mediating gear TMG is used for realizing the first forward, third, fifth, and seventh speeds.

The first and second synchronizers SN1 and SN2 may be formed as a known scheme, and the first and second sleeves SLE1 and SLE2 applied to the first and second synchronizers SN1 and SN2 may be operated by respective actuators which may be controlled by a transmission control unit.

FIG. 4 is a shifting operation chart of a power transmission apparatus configured for a vehicle according to various exemplary embodiments of the present invention, and the power transmission apparatus configured for a vehicle according to various exemplary embodiments performs shifting operation as follows.

[Engine and Parallel Mode Reverse Speed]

In the engine and parallel mode reverse speed REV, as shown in FIG. 4, the intermediate shaft CS and the fourth drive gear IDG4 are synchronously interconnected by the operation of the sleeve SLE1 of the first synchronizer SN1, and the engine clutch ECL and the first and third clutches CL1 and CL3 are operated.

As a result, by the operation of the first clutch CL1, the torque of the engine ENG is reversely input to the third shifting section TM3 through the third input shaft IS3, the first gear set GL1, the fourth gear set GL4, the fifth gear set GL5, and the second gear set GL2.

In the third shifting section TM3, the second planetary gear set PG2 integrally rotates by the operation of the third clutch CL3, and therefore, the torque input to the second ring gear R2 is output as inputted, to the differential DIFF through the output shaft OS, realizing the reverse speed.

[The Engine and Parallel Mode First Forward Speed]

In the engine and parallel mode first forward speed FD1, as shown in FIG. 4, the torque mediating shaft TMS and the torque mediating gear TMG are synchronously interconnected by the operation of the sleeve SLE2 of the second synchronizer SN2, and the engine clutch ECL and the third clutch CL3 and second brake B2 are operated.

As a result, the torque of the engine ENG is transmitted to the first sun gear S1 of second shifting section TM2 through the first input shaft IS1. In the second shifting section TM2, the first ring gear R1 acts as a fixed element by the operation of the second brake B2, and a torque of a decreased rotation speed is output through the first planet carrier PC1.

As such, the torque output from the first planet carrier PC1 is input to the second driven gear IPG2 of the third shifting section TM3 through the torque mediating shaft TMS and the torque mediating gear TMG. In the third shifting section TM3, the second planetary gear set PG2 integrally rotates by the operation of the third clutch CL3, and therefore, the torque input to the second ring gear R2 is output as inputted, to the differential DIFF through the output shaft OS, realizing the first forward speed FD1.

The first forward speed is realized by the reduction ratio of the first planetary gear set PG1 and the gear ratio of the second gear set GL2.

[The Engine and Parallel Mode Second Forward Speed]

In the engine and parallel mode second forward speed FD2, as shown in FIG. 4, the intermediate shaft CS and the second drive gear IDG2 are synchronously interconnected by the operation of the sleeve SLE1 of the first synchronizer SN1, and the engine clutch ECL and the first and third clutches CL1 and CL3 are operated.

As a result, by the operation of the first clutch CL1, the torque of the engine ENG is input to the third shifting section TM3 through the third input shaft IS3, the first gear set GL1, and the second gear set GL2.

In the third shifting section TM3, the second planetary gear set PG2 integrally rotates by the operation of the third clutch CL3, and therefore, the torque input to the second ring gear R2 is output as inputted, to the differential DIFF through the output shaft OS, realizing the second forward speed FD2.

The gear ratios of the first and second gear sets GL1 and GL2 are used for realizing the second forward speed.

[The Engine and Parallel Mode Third Forward Speed]

In the engine and parallel mode third forward speed FD3, as shown in FIG. 4, the torque mediating shaft TMS and the torque mediating gear TMG are synchronously interconnected by the operation of the sleeve SLE2 of the second synchronizer SN2, and the engine clutch ECL and the third and fourth clutches CL3 and CL4 are operated.

As a result, the torque of the engine ENG is transmitted to the first sun gear S1 of second shifting section TM2 through the first input shaft IS1. In the second shifting section TM2, the first planetary gear set PG1 integrally rotates integrally rotates by the operation of the fourth clutch CL4, and therefore, the torque input to the first sun gear S1 is output as inputted, to the second driven gear IPG2 of the third shifting section TM3 through the torque mediating shaft TMS and the torque mediating gear TMG.

In the third shifting section TM3, the second planetary gear set PG2 integrally rotates by the operation of the third clutch CL3, and therefore, the torque input to the second ring gear R2 through the second driven gear IPG2 of the second gear set GL2 is output as inputted, to the differential DIFF through the output shaft OS, realizing the third forward speed FD3.

The gear ratio of the second gear set GL21 used for realizing the third forward speed.

[The Engine and Parallel Mode Fourth Forward Speed]

In the engine and parallel mode fourth forward speed FD4, as shown in FIG. 4, both the first and second synchronizers SN1 and SN2 are maintained neutral, and the engine clutch ECL and the second and third clutches CL2 and CL3 are operated.

As a result, by the operation of the second clutch CL2, the torque of the second input shaft IS2 is input to the second planet carrier PC2 of the third shifting section TM3 through the third gear set GL3.

In the third shifting section TM3, the second planetary gear set PG2 integrally rotates by the operation of the third clutch CL3, and therefore, the torque input to the second planet carrier PC2 is output as inputted, to the differential DIFF through the output shaft OS, realizing the fourth forward speed FD4.

The gear ratio of the third gear set GL31 used for realizing the fourth forward speed.

[The Engine and Parallel Mode Fifth Forward Speed]

In the engine and parallel mode fifth forward speed FD5, as shown in FIG. 4, the torque mediating shaft TMS and the torque mediating gear TMG are synchronously interconnected by the operation of the sleeve SLE2 of the second synchronizer SN2, and the engine clutch ECL and the second, fourth clutch CL2 and CL4 are operated.

As a result, the torque of the engine ENG is transmitted to the first sun gear S1 of second shifting section TM2 through the first input shaft IS1. In the second shifting section TM2, the first planetary gear set PG1 integrally rotates integrally rotates by the operation of the fourth clutch CL4, and therefore, the torque input to the first sun gear S1 is output as inputted, to the second driven gear IPG2 of the third shifting section TM3 through the torque mediating shaft TMS and the torque mediating gear TMG.

Furthermore, by the operation of the second clutch CL2, the torque of the engine ENG is partially input to the second planet carrier PC2 of the third shifting section TM3 through the second input shaft IS2 and the third gear set GL3.

In the third shifting section TM3, a torque is input to the second ring gear R2 through the second driven gear IPG2 of the second gear set GL2, and simultaneously, the second planet carrier PC2 receives a torque from the second input shaft IS2 through the third gear set GL3. Therefore, an output torque is formed by cooperative operation of rotation speeds of the second ring gear R2 and the second planet carrier PC2, and the output torque is transmitted to the differential DIFF through the output shaft OS, realizing the fifth forward speed FD5.

The fifth forward speed is realized by gear ratios of the second gear set GL2 and third gear set GL3.

[The Engine and Parallel Mode Sixth Forward Speed]

In the engine and parallel mode sixth forward speed FD6, as shown in FIG. 4, the intermediate shaft CS and the second drive gear IDG2 are synchronously interconnected by the operation of the sleeve SLE1 of the first synchronizer SN1, and the engine clutch ECL and the first clutch and second clutch CL1 and CL2 are operated.

As a result, by the operation of the first clutch CL1, the torque of the engine ENG is input to the second ring gear R2 of the third shifting section TM3 through the third input shaft IS3, the first gear set GL1, and the second gear set GL2.

Furthermore, by the operation of the second clutch CL2, the torque of the engine ENG is partially input to the second planet carrier PC2 of the third shifting section TM3 through the second input shaft IS2 and third gear set GL3.

In the third shifting section TM3, a torque is input to the second ring gear R2 through the second gear set GL2, and simultaneously, the second planet carrier PC2 receives a torque from the second input shaft IS2 through the third gear set GL3. Therefore, an output torque is formed by cooperative operation of rotation speeds of the second ring gear R2 and the second planet carrier PC2, and the output torque is transmitted to the differential DIFF through the output shaft OS, realizing the sixth forward speed FD6.

In such a sixth forward speed, the torque according to the gear ratios of the first and second gear sets G1 and G2 is input to the second ring gear R2, and the torque according to the gear ratio of the third gear set G3 is input to the second planet carrier PC2, forming a shifting with an increased rotation speed.

[The Engine and Parallel Mode Seventh Forward Speed]

In the engine and parallel mode seventh forward speed FD7, as shown in FIG. 4, the torque mediating shaft TMS and the torque mediating gear TMG are synchronously interconnected by the operation of the sleeve SLE2 of the second synchronizer SN2, and the engine clutch ECL and the second clutch CL2 and second brake B2 are operated.

As a result, the torque of the engine ENG is transmitted to the first sun gear S1 of second shifting section TM2 through the first input shaft IS1. In the second shifting section TM2, the first ring gear R1 acts as a fixed element by the operation of the second brake B2, and a torque of a decreased rotation speed is output through the first planet carrier PC1. The torque output from the first planet carrier PC1 is input to the second ring gear R2 of the third shifting section TM3 through the torque mediating shaft TMS and the second gear set GL2.

Furthermore, by the operation of the second clutch CL2, the torque of the engine ENG is partially input to the second planet carrier PC2 of the third shifting section TM3 through the second input shaft IS2 and the third gear set GL3.

In the third shifting section TM3, a torque is input to the second ring gear R2 through the second gear set GL2, and simultaneously, the second planet carrier PC2 receives a torque from the second input shaft IS2 through the third gear set GL3. Therefore, an output torque is formed by cooperative operation of rotation speeds of the second ring gear R2 and the second planet carrier PC2, and the output torque is transmitted to the differential DIFF through the output shaft OS, realizing the seventh forward speed FD7.

In such a seventh forward speed, a torque from the second shifting section TM2 is input to the second ring gear R2, and a torque according to the In such a seventh forward speed, the planetary gear set PG outputs a further increased speed than in the sixth forward speed.

[The Engine and Parallel Mode Eighth Forward Speed]

In the engine and parallel mode eighth forward speed FD8, as shown in FIG. 4, the torque mediating shaft TMS and the torque mediating gear TMG are synchronously interconnected by the operation of the sleeve SLE2 of the second synchronizer SN2, and the engine clutch ECL and the second clutch CL2 and first brake B1 are operated.

As a result, in the second shifting section TM2, the first planet carrier PC1 acts as a fixed element by the operation of the first brake B1, and therefore, the first planet carrier PC1 fixedly connected to the torque mediating shaft TMS and the second gear set GL2 is stopped.

In the third shifting section TM3, the second ring gear R2 externally gear-meshed with the second driven gear IPG2 acts as a fixed element. In such a state, by the operation of the second clutch CL2, the torque of the second input shaft IS2 is input to the second planet carrier PC2 through the third gear set GL3. Therefore, the third shifting section TM3 forms an output torque of an increased rotation speed, and the output torque is transmitted to the differential DIFF through the output shaft OS, realizing the eighth forward speed FD8.

In such an eighth forward speed, the planetary gear set PG outputs a further increased speed than in the seventh forward speed.

[The Engine and Parallel Mode Ninth Forward Speed]

In the engine and parallel mode ninth forward speed FD9, as shown in FIG. 4, the intermediate shaft CS and the fourth drive gear IDG4 are synchronously interconnected by the operation of the sleeve SLE1 of the first synchronizer SN1, and the engine clutch ECL and the first clutch and second clutch CL1 and CL2 are operated.

As a result, by the operation of the first clutch CL1, the torque of the engine ENG is reversely input to the second ring gear R2 of the third shifting section TM3 through the third input shaft IS3, the first gear set GL1, the fourth gear set GL4, the fifth gear set GL5, and the second gear set GL2.

In such a state, by the operation of the second clutch CL2, the torque of the second input shaft IS2 is input to the second planet carrier PC2 through the third gear set GL3. Therefore, the third shifting section TM3 forms an output torque of an increased rotation speed, and the output torque is transmitted to the differential DIFF through the output shaft OS, realizing the ninth forward speed FD9.

In such a ninth forward speed, the planetary gear set PG outputs a further increased speed than in the eighth forward speed.

In the above description of the "engine and parallel mode", only the engine ENG is exampled as a power source. However, it may be obviously understood that such shifting operation may be maintained even if the motor/generator MG is activated to form a parallel mode and assist the engine ENG.

An electric vehicle mode EV mode differs from the engine and parallel mode, only in that the engine ENG is stopped while releasing the engine clutch ECL and only the motor/generator MG is used as sole power source. It may be understood that such a difference will not affect the above-described shifting operation, and thus, in such an electric vehicle mode EV mode the same shaft-shifting stages of one reverse speed REV and nine forward speeds of the first forward speed FD1 to the ninth forward speed FD9 may be obtained by the same operational chart.

A power transmission apparatus configured for a vehicle according to an exemplary embodiment of the present invention realizes shifting stages of nine forward speeds and one reverse speed by further employing one clutch and two synchronizers than in the various exemplary embodiments. Furthermore, an engine driving mode, a parallel hybrid mode, and an electric vehicle mode are realized in multiple shifting stages, further improving fuel consumption.

While the present invention has been described in connection with what is presently considered to be practical exemplary embodiments of the present invention, it is to be understood that the present invention is not limited to the disclosed exemplary embodiments of the present invention, but, On the other hand, is directed to cover various modifications and equivalent claims as well as various alternatives and modifications thereof. It is intended that the scope of the present invention be defined by the Claims appended hereto and their equivalents."

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a vehicle having a motor/generator and an engine, the power transmission apparatus comprising:
   a first input shaft fixedly connected to the motor/generator;
   a second input shaft formed as a hollow shaft, mounted coaxial with and external to the first input shaft without rotational interference between the second input shaft and the first input shaft, and selectively connectable to the first input shaft;
   a third input shaft formed as a hollow shaft, mounted coaxial with and external to the second input shaft without rotational interference between the third input shaft and the second input shaft, and selectively connectable to the first input shaft;

a torque mediating shaft formed as a hollow shaft mounted coaxial with and external to a portion of the first input shaft without rotational interference between the torque mediating shaft and the first input shaft;

an intermediate shaft mounted in parallel with the first input shaft;

an output shaft mounted in parallel with the first input shaft;

a first shifting section configured for receiving a torque selectively transmitted from the third input shaft, and modifying the received torque to output the modified torque to the torque mediating shaft;

a second shifting section including a first planetary gear set engaged to the torque mediating shaft and having three rotation elements of a first sun gear, a first planet carrier, and a first ring gear, shifting a torque received from the first input shaft to output the shifted torque to the torque mediating shaft, and selectively stopping a rotation of the torque mediating shaft, wherein the first sun gear is fixedly connected to the first input shaft; and a third shifting section including a second planetary gear set having three rotation elements of a second sun gear, a second planet carrier, and a second ring gear, forming an output torque in combination of a torque input from the first and second shifting sections and a torque selectively input from the second input shaft, and outputting the output torque to the output shaft, wherein the second sun gear is fixedly connected to the output shaft.

2. The power transmission apparatus of claim 1, wherein the first shifting section includes:

a first gear set including a first drive gear fixedly connected to the third input shaft, and a first driven gear fixedly connected to the intermediate shaft and gear-meshed with the first drive gear; and a second gear set including a second drive gear fixedly connected to the intermediate shaft, a torque mediating gear fixedly connected to the torque mediating shaft and gear-meshed with the second drive gear, and a second driven gear fixedly connected to the second ring gear of the second planetary gear set and gear-meshed with the torque mediating gear.

3. The power transmission apparatus of claim 2, wherein the first sun gear of the first planetary gear set is fixedly connected to the first input shaft;

wherein the first planet carrier of the first planetary gear set is fixedly connected to the torque mediating shaft and selectively connectable to a transmission housing; and wherein the first ring gear of the first planetary gear set is selectively connectable to the transmission housing.

4. The power transmission apparatus of claim 3, wherein the second sun gear of the second planetary gear set is fixedly connected to the output shaft and selectively connectable to the second ring gear;

wherein the second planet carrier of the second planetary gear set receives a torque from the second input shaft through a third gear set; and wherein the second ring gear of the second planetary gear set receives a torque from the first and second shifting sections.

5. The power transmission apparatus of claim 4, wherein the third gear set includes:

a third drive gear fixedly connected to the second input shaft; and a third driven gear fixedly connected to the second planet carrier of the second planetary gear set and gear-meshed with the third drive gear.

6. The power transmission apparatus of claim 4, wherein gear ratios of the first gear set and the second gear set are used for realizing a second forward speed;

wherein a gear ratio of the third gear set is used for realizing a third forward speed; and wherein a gear ratio of the torque mediating gear and the second driven gear is used for realizing a first forward speed.

7. The power transmission apparatus of claim 4, further including:

four clutches each selectively connecting a corresponding pair among the first to third shafts and at least one rotation element among the three rotation elements of the second planetary gear set; and two brakes each selectively connecting a rotation element among the three rotation elements of the first planetary gear set to the transmission housing.

8. The power transmission apparatus of claim 7, wherein the four clutches comprise:

an engine clutch mounted between the first input shaft and an engine output shaft connected to the engine;

a first clutch mounted between the first input shaft and the third input shaft;

a second clutch mounted between the first input shaft and the second input shaft; and a third clutch mounted between the second ring gear and the output shaft fixedly connected to the second sun gear, and wherein the two brakes comprise:

a first brake mounted between the first planet carrier of the first planetary gear set and the transmission housing; and a second brake mounted between the first ring gear of the first planetary gear set and the transmission housing.

9. The power transmission apparatus of claim 1, wherein the first shifting section includes:

an idle shaft mounted in parallel with the intermediate shaft;

a first gear set including a first drive gear fixedly connected to the third input shaft, and a first driven gear fixedly connected to the intermediate shaft and gear-meshed with the first drive gear;

a second gear set including a second drive gear mounted coaxial with the intermediate shaft without rotational interference between the second drive gear and the intermediate shaft, a torque mediating gear mounted coaxial with the torque mediating shaft without rotational interference between the torque mediating gear and the torque mediating shaft and gear-meshed with the second drive gear, and a second driven gear fixedly connected to the second ring gear of the second planetary gear set and gear-meshed with the torque mediating gear;

a fourth gear set including a fourth drive gear mounted coaxial with and external to the intermediate shaft without rotational interference between the fourth drive gear and the intermediate shaft, and a fourth driven gear fixedly connected to the idle shaft and gear-meshed with the fourth drive gear; and a fifth gear set including a fifth drive gear fixedly connected to the idle shaft, and the torque mediating gear gear-meshed with the fifth drive gear.

10. The power transmission apparatus of claim 9, wherein the first shifting section further includes:
- a first synchronizer selectively connecting the second drive gear or the fourth drive gear to the intermediate shaft; and
- a second synchronizer selectively connecting the torque mediating gear to the torque mediating shaft.

11. The power transmission apparatus of claim 9, wherein the idle shaft receives a torque from the intermediate shaft through the fourth gear set and outputs a torque of decreased rotation speed to the third shifting section through the fifth gear set.

12. The power transmission apparatus of claim 10, wherein the first sun gear of the first planetary gear set is fixedly connected to the first input shaft;
wherein the first planet carrier of the first planetary gear set is fixedly connected to the torque mediating shaft and selectively connectable to a transmission housing;
wherein the first ring gear of the first planetary gear set is selectively connectable to the transmission housing; and
wherein the first planet carrier and the first ring gear are selectively connectable to each other.

13. The power transmission apparatus of claim 12, wherein the second sun gear of the second planetary gear set is fixedly connected to the output shaft and selectively connectable to the second ring gear;
wherein the second planet carrier of the second planetary gear set receives a torque from the second input shaft through a third gear set; and
wherein the second ring gear of the second planetary gear set receives a torque from the first and second shifting sections through the second gear set.

14. The power transmission apparatus of claim 13, wherein the third gear set comprise:
- a third drive gear fixedly connected to the second input shaft; and
- a third driven gear fixedly connected to the second planet carrier of the second planetary gear set and gear-meshed with the third drive gear.

15. The power transmission apparatus of claim 13,
wherein gear ratios of the fourth and fifth gear sets are used for realizing a ninth forward speed and a reverse speed;
wherein a gear ratio of the second drive gear is used for realizing a second forward speed and a sixth forward speed; and
wherein a gear ratio of the torque mediating gear is used for realizing a first forward speed, a third forward speed, a fifth forward speed, and a seventh forward speed.

16. The power transmission apparatus of claim 13, further including:
- five clutches each selectively connecting a corresponding pair among the first to third shafts and the torque mediating shaft and at least one rotation element among the three rotation elements of the second planetary gear set and the three rotation elements of the second planetary gear set; and
- two brakes each selectively connecting a rotation element among the three rotation elements of the first planetary gear set to the transmission housing.

17. The power transmission apparatus of claim 16, wherein the five clutches comprise:
- an engine clutch mounted between the first input shaft and an engine output shaft connected to the engine;
- a first clutch mounted between the first input shaft and the third input shaft;
- a second clutch mounted between the first input shaft and the second input shaft;
- a third clutch mounted between the second ring gear and the output shaft fixedly connected to the second sun gear; and
- a fourth clutch mounted between the first ring gear and the first planet carrier, and wherein the two brakes comprise:
- a first brake mounted between the first planet carrier of the first planetary gear set and the transmission housing; and
- a second brake mounted between the first ring gear of the first planetary gear set and the transmission housing.

* * * * *